Nov. 6, 1962    H. BAUER ET AL    3,062,940
WELDING FITTING
Filed Feb. 17, 1959    2 Sheets-Sheet 1
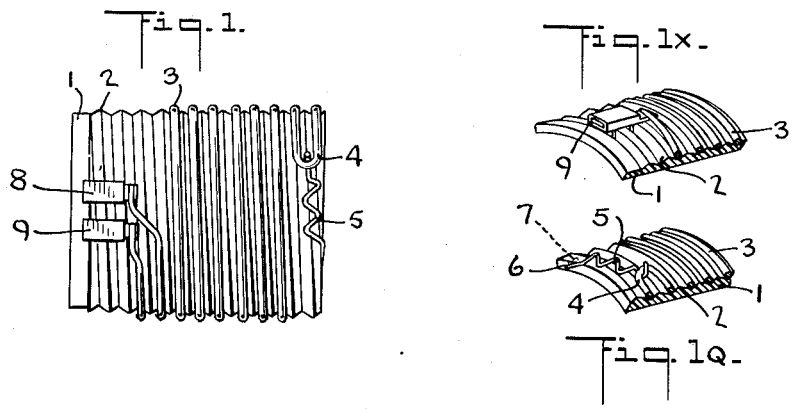
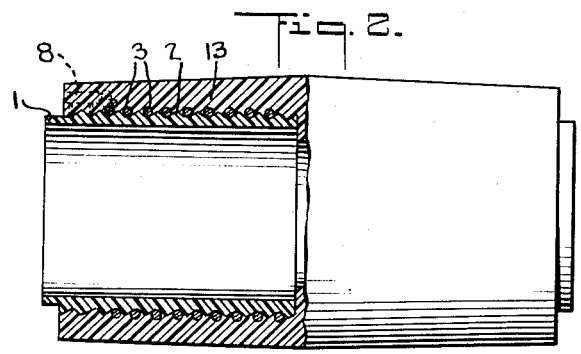
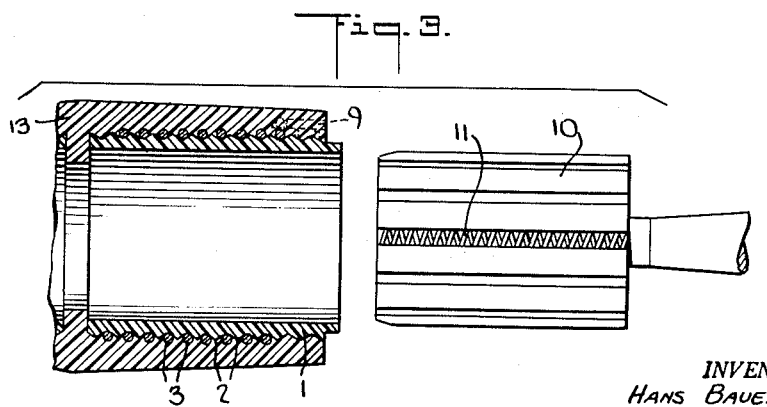
INVENTORS
HANS BAUER
HELMUT HOLZER
BY
AGENT Nov. 6, 1962  H. BAUER ET AL  3,062,940
WELDING FITTING Filed Feb. 17, 1959  2 Sheets-Sheet 2

INVENTORS
HANS BAUER
HELMUT HOLZER
BY

AGENT

United States Patent Office 3,062,940
Patented Nov. 6, 1962

3,062,940
WELDING FITTING
Hans Bauer, Neu-Ulm, and Helmut Holzer, Ulm, Germany, assignors to Sud-West-Chemie G.m.b.H., Neu-Ulm (Danube), Germany, a corporation of Germany
Filed Feb. 17, 1959, Ser. No. 793,754
Claims priority, application Germany Feb. 17, 1958
6 Claims. (Cl. 219—19)

The invention relates to a so-called welding fitting, i.e. to a fitting which consists of a thermoplastic plastic in which is embedded a metallic heating element, more especially a bifilar coil of heating wire which can be connected to a source of electric current, and to a process for the production of such fittings.

The manufacture of such fittings by the injection molding process presents a number of economic and technical difficulties. The winding of the heating element, for example the bifilar heating wire, on the core of the mold, in order to connect the wire to the fitting which is injection-molded over the core, necessitates the provision of a very large number of cores which have to be wound by hand, which can only be prepared in a very limited number, and, since the core has to be removed from the mold and rewound after each operation consequently lead to a relationship between the winding of the core and the making of the molded elements which is uneconomic as regards place and time.

The invention provides a method of manufacturing welding fittings which obviates these disadvantages and can be carried out easily and economically, the said fittings being safeguarded against short-circuits. The fittings of the invention are reliable in use, for example in the welding of tubes and produce excellent uniform welds when a current is applied to the metallic heating element.

The invention also provides two intermediate products, the first being in the form of a carrier tube bearing the heating element to be embedded in the sleeve, which carrier tube can be made at a different place and a different time and stored prior to being used in the manufacture of the fitting by injection molding and, if necessary can also be despatched to a very remote injection molding plant.

The second intermediate product comprises the carrier tube, the heating element and the sleeve which has been molded on to the carrier tube and heating element by injection molding. This second intermediate product can be stored, despatched and handled without any difficulties and without danger of mechanical damage, the heating elements and the welding surface thereof also being protected, by the carrier and the sleeve, against chemical influences, for example the atmosphere, and can easily be transformed in situ into the fitting ready for use, even by unskilled labour.

The fitting according to the invention can consist of any desired thermoplastic plastic, provided that it is capable of being welded. Polyethylene, especially high-pressure polyethylene and also low-pressure polyethylene or a polyethylene copolymer can advantageously be used as material for the fitting.

The invention also relates to a preferred method of making the fitting, starting from the first intermediate product, and to a preferred embodiment of a means for carrying out this preparation.

The process according to the invention comprises in jection molding the sleeve over a core, on which is placed the comparatively thin-walled carrier of a thermoplastic plastic which is to be detachably united to the fitting when the latter is molded, the said carrier having arranged thereon the heating conductor, preferably in the form of a bifilar wire winding which is anchored to the carrier and provided with contact sockets prior to the molding operation.

More especially thermoplastic plastics having a comparatively low softening range, for example polyvinyl chloride, are suitable as material for this carrier which bears the heating conductor which is to be united to the sleeve during the molding operation. The carrier is to be detached from the sleeve by heat leaving the heating conductor embedded in the sleeve.

If care is taken that no firm union of the carrier with the sleeve which cannot subsequently be released is produced during the injection molding, it is possible in certain circumstances for the termoplastic plastic of the carrier to be the same as that of the sleeve. This is possible when the injection molding operation is so conducted that the heat of the injection material is not sufficient for melting or softening and displacing the material of the carrier.

For the carrier it is, however, preferred to use a thermoplastic material which is different from the sleeve material. It is advantageous to use a thermoplastic material with a low softening temperature.

When polyethylene is used as the material of the sleeve, a material which is suitable for the carrier is polyvinyl chloride, more especially rigid polyvinyl chloride. The thickness of the wall of the carrier can vary according to the plastic specially chosen, a condition being that the carrier must have adequate strength at ordinary temperature in order to withstand the tight winding of the heating wire, and on the other hand must be sufficiently lacking in rigidity on heating (after molding on the sleeve and embedding the heating conductor) in order that it can be deformed and removed from the fitting.

With sleeves having an internal diameter of about 5 cm. and using polyvinyl chloride, for example rigid polyvinyl chloride, as carrier material, carrier having wall thicknesses of 2 mm., 1½ mm. and also 1 mm. are suitable, since these carriers have adequate strength at ordinary temperature and, when heated to, for example, 80° C., show a sufficient lack of rigidity to allow them to be deformed and removed.

According to one preferred embodiment of the invention, the carrier of thermoplastic material is provided with screw-threads which facilitate the winding of the bifilar heating coil, prevent contact between the turns of the wire and safeguard against displacement of the coil when molding and guarantee an excellent embedding action. The contact sockets which are eventually to be embedded in the sleeve are arranged on the carrier and the end loop of the coil is also fixed to the carrier. Both these steps are possible, especially with hard polyvinyl chloride, by introducing fixing members, for example pins, into the wall of the carrier for securing the end loop by fixing thereto a holding element, for example a section of spring wire, which is embedded in the end face of the carrier.

During the injection molding, the carrier is so united with the sleeve that a comparatively firm bond is formed at ordinary temperatures, whereas on heating the carrier, the latter can be readily deformed, released and withdrawn from the sleeve, for example after mechanically detaching an annular rim surface.

The product of this method is an intermediate product with an inner protective carrier, since the fitted carrier remains united with the sleeve.

Such a product, the embedded heating conductor and the welded surface of which are protected against mechanical and chemical influences, has considerable advantages over known fittings, since the stacking and handling without danger of damage is facilitated.

The removal of the carrier by heating, deformation and extraction can readily be carried out by unskilled labour, for example at the place of use. It is necessary to carry out the heating in such a way that the carrier becomes flabby and lacking in rigidity without the material of the sleeve being substantially heated or melted.

Any method can be used for heating this carrier. It could even be effected by using the heating conductor of the fitting. In this case however damage could be caused in the sleeve, so that according to a preferred embodiment, the heating of the carrier of the intermediate product is effected from inside, more especially by introducing a heating member touching the internal surfaces of the carrier, more especially an electric heating member of circular cross-section.

When such a heating member, for example an electrically heated mandrel of circular cross-section, is introduced into the carrier, the flabby condition of the carrier is produced within a short time, for example 60 seconds, after applying a current to the heating member, whereafter the heater is extracted from the carrier. After loosening the annular edge of the sleeve, for example by means of any suitable instrument such as for example a screwdriver (damage to the turns of wire at the surface is not to be feared, since the wire turns usually do not reach the rim of the fitting according to the invention), the carrier can be gripped, for example with a pair of pliers, can be bent inwardly towards the centre and thereby detached and removed from the sleeve without any damage to the latter or the heating conductor embedded therein, since the connection between the carrier and the sleeve is comparatively non-rigid and the carrier because of the material from which it is made, is so flabby that damage to the sleeve, consisting for example of polyethylene, is avoided.

If the carrier is detached from the intermediate product at the place of use, previous damaging influence on the welding surfaces and on the embedded wire is not to be feared and the welding proceeds easily and with certainty.

A preferred embodiment of the invention is shown in the accompanying drawings, wherein:

FIGURE 1 is a side elevation of the carrier fitted with a heating coil, part-sectional views being shown at X and Q.

FIGURE 2 is a part-sectional elevation of the initial intermediate product with the carrier.

FIGURE 3 is a side elevation of the heating mandrel.

Figure 4:
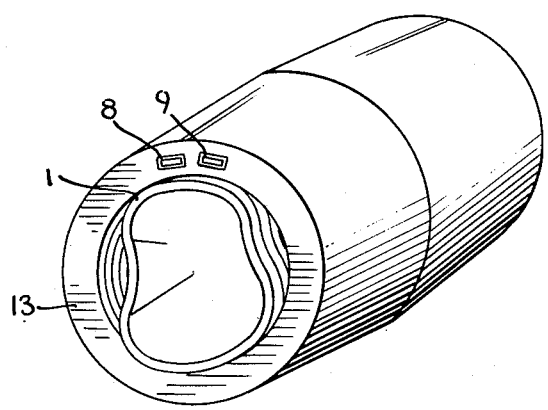
FIGURE 4 is a perspective view showing the heated and deformed carrier ready for removal.

A carrier 1 (the internal diameter of which corresponds to the external diameter of the core of a die mold to be used for molding a sleeve) comprises on its surface a tapped screw-thread 2, in which a wire 3 is laid, this wire being held at one end loop 4 by a holding element 5, consisting for example of steel wire, which is connected to the carrier 1 by introducing end 6 of this holding element into a hole 7 in the end face of the carrier. Contact sockets 8 and 9 with their fixing pins are let into the surface of the carrier at the other end of the latter.

The initial intermediate product contains this carrier 1 within a sleeve.

Figure 5:
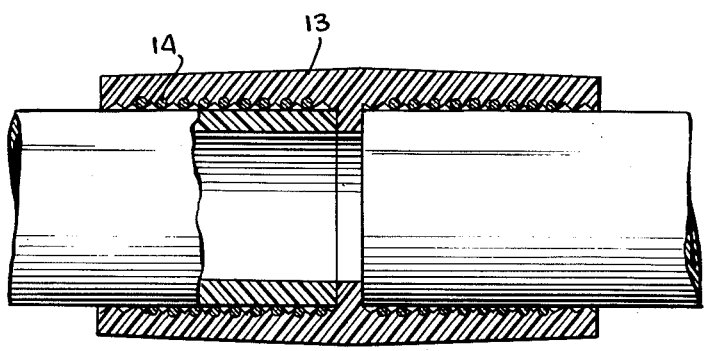
FIGURE 5 is a section showing the completed fitting.

A heating mandrel 10 (FIGURE 3) is fitted with an electric heating element 11, which when inserted into the carrier, quickly heats the carrier 1, the rim of which is then softened and engaged by a gripping element at 12 and, as shown in FIGURE 4, the said edge is deformed and in fact bent inwardly, so that the protective carrier can easily be extracted from the sleeve to provide the completed fitting (FIGURE 5) with wire turns 14 disposed on the internal surface thereof.

*Example*

The invention is illustrated in the following example for the jointing of polyethylene pipe of 90 mm. o. dia. but not limited thereto.

A tube consisting of unplasticized PVC and having an internal diameter of 85 mm., a wall thickness of 3 mm. and a length of 80 mm. with an outside screw-thread is used as a carrier for the heating element, the latter comprising a copper wire of .55 mm. dia. with an electrical resistance of .09 ohm per metre and a total length of 13 metres wound onto the screw-therads of the carrier and fixed at one end of the bifilar coil by means of a pin and at the other being fitted with connecting sockets which are anchored to the mould by removable adaptors.

In the process of manufacturing a sleeve this assembly (consisting of the carrier tube and the heating element) is placed on the detachable core (with an outside diameter of 85 mm.) of an injection mold as used in a known manner for the forming of sleeves or fittings from polyethylene.

In the aforesaid instance the properties of this material are as follows:

Melt index (according to BSS 1972:1953:1.5
Molecular weight (approx.): 100,000
Specific gravity: 0.96

After being stored and shipped to the place of use the sleeve with the heating conductor embedded in its inside walls and with the carrier still attached as a protective element is heated by inserting for a period of 80 seconds a mandrel having a temperature of 120° C., resulting in the softening of the carrier material and allowing its subsequent removal from the sleeve which is then ready for forming welded joints of polyethylene pipes according to methods of prior art.

What we claim is:

1. A welding fitting which comprises a sleeve of a comparatively high melting point thermoplastic material, a heating element embedded therein, a carrier united to the internal surface of the sleeve, the said carrier being made of a thermoplastic material which loses its rigidity at a comparatively low temperature.

2. The welding fitting of claim 1 wherein the heating element is a bifilar winding.

3. The welding fitting of claim 1, wherein the carrier is of polyvinyl chloride.

4. The welding fitting of claim 1, wherein the sleeve is of polyethylene.

5. A carrier tube for a bifilar heating coil of a sleeve-like welding fitting, the carrier tube and the welding sleeve being of thermoplastic material, the thermoplastic material of the carrier tube softening at a lower temperature than the thermoplastic material of the sleeve, the carrier tube having screw threads on its surface wherein the heating coil is laid, and the carrier comprising fixing elements for the end loop of the coil and contact sockets.

6. A welding fitting comprising a sleeve of a comparatively high melting point thermoplastic material, a bifilar heating coil embedded therein, and a carrier tube united to the internal surface of the sleeve, the carrier tube being of a thermoplastic material softening at a lower point than the thermoplastic material of the sleeve.

(References on following page)

References Cited in the file of this patent

UNITED STATES PATENTS

| | | |
|---|---|---|
| 2,163,993 | Dufour et al. | June 27, 1939 |
| 2,460,874 | Coberly | Feb. 8, 1949 |
| 2,465,722 | Hamilton | Mar. 29, 1949 |
| 2,739,829 | Pedlow et al. | Mar. 27, 1956 |
| 2,741,402 | Sayre | Apr. 10, 1956 |
| 2,780,837 | Math | Feb. 12, 1957 |
| 2,845,475 | Behr et al. | July 29, 1958 |
| 2,845,516 | Jones | July 29, 1958 |

FOREIGN PATENTS

| | | |
|---|---|---|
| 809,560 | Great Britain | Feb. 25, 1959 |
| 954,092 | Germany | Dec. 13, 1956 |
| 1,048,106 | Germany | Dec. 31, 1958 |

OTHER REFERENCES

Resistance-Welded Plastic Pipe Joints, "Modern Plastics," November 1956, pp. 150–1.